(12) United States Patent

Ryu et al.

(10) Patent No.: US 9,563,078 B2
(45) Date of Patent: Feb. 7, 2017

(54) FRAME FOR DISPLAY DEVICE AND DISPLAY DEVICE HAVING THE SAME

(71) Applicant: Samsung Display Co., Ltd., Yongin, Gyeonggi-Do (KR)

(72) Inventors: Su-Chang Ryu, Yongin-si (KR); Sang-Heon Ye, Cheonan-si (KR); Joo-Woan Cho, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 250 days.

(21) Appl. No.: 14/081,221

(22) Filed: Nov. 15, 2013

(65) Prior Publication Data

US 2015/0029696 A1  Jan. 29, 2015

(30) Foreign Application Priority Data

Jul. 23, 2013 (KR) .......................... 10-2013-0086431

(51) Int. Cl.
*G02F 1/1335* (2006.01)
*G02F 1/1333* (2006.01)

(52) U.S. Cl.
CPC ............... *G02F 1/133608* (2013.01); *G02F 2001/133328* (2013.01)

(58) Field of Classification Search
CPC ............. G02F 1/133608; G02F 2001/133328; G02F 1/133308; G09F 15/0018; A47G 1/16
USPC ............................................. 349/58; 40/549
See application file for complete search history.

(56) References Cited

U.S. PATENT DOCUMENTS

| 3,813,800 A * | 6/1974 | Turner ..................... G09F 1/12 40/781 |
| 4,261,124 A * | 4/1981 | Carter ...................... G09F 1/12 40/760 |
| 7,764,331 B2 * | 7/2010 | Choi ..................... G06F 1/1601 349/58 |
| 7,852,424 B2 * | 12/2010 | Sugawara ......... G02F 1/133308 349/122 |
| 8,345,180 B2 | 1/2013 | Chiu et al. |
| 2007/0190889 A1 | 8/2007 | Lee et al. |
| 2007/0204501 A1 * | 9/2007 | Isayev ................ G09F 15/0018 40/793 |
| 2008/0060244 A1 | 3/2008 | Yang et al. |
| 2012/0210622 A1 * | 8/2012 | Suciu et al. .................... 40/757 |
| 2013/0247436 A1 * | 9/2013 | Tolna ...................... A47G 1/06 40/765 |

FOREIGN PATENT DOCUMENTS

| KR | 1020080040460 A | 5/2008 |
| KR | 1020090112069 A | 10/2009 |
| KR | 1020110019225 A | 2/2011 |

* cited by examiner

*Primary Examiner* — Karabi Guharay
(74) *Attorney, Agent, or Firm* — Cantor Colburn LLP (57) ABSTRACT

A frame for display device includes a plurality of cover members. Each of the cover members includes a support portion including a supporting body extending in a first direction, and a first extending portion extending from the supporting body in a second direction substantially perpendicular to the first direction, the first extending portion supporting an edge portion of a support plate of the display device, and a sidewall portion extending from the support portion to form a predetermined acute angle with respect to the support portion and covering a side of the display device.

13 Claims, 9 Drawing Sheets

FRAME FOR DISPLAY DEVICE AND DISPLAY DEVICE HAVING THE SAME

This application claims priority to Korean Patent Application No. 10-2013-0086431, filed on Jul. 23, 2013, and all the benefits accruing therefrom under 35 U.S.C. §119, the contents of which are herein incorporated by reference in their entirety.

BACKGROUND

1. Field

Exemplary embodiments relate to a frame for display device and a display device including the same. More particularly, exemplary embodiments relate to a frame for display device covering sides of a display device and a display device including the same.

2. Description of the Related Art

Generally, a flat display device such as a liquid crystal display device may include a display unit such as a liquid crystal display panel, and a backlight unit supplying light to the display unit which displays an image.

In order to assemble the display unit and the backlight unit, a container may be used to receive the display unit and the backlight unit. A conventional container may include a metal material having a sufficient hardness. In a large screen television, a plurality of members such as chassis may be used for the container. The chassis may be formed by a metal plate process. The container may include a bottom portion, and a sidewall portion extending from the bottom portion.

However, as the display device becomes larger, when the chassis is formed by a press process, a manufacturing cost of the chassis may be increased and a weight of the display device may be increased.

SUMMARY

One or more exemplary embodiment provides a lightweight frame for a display device, having excellent rigidity and hardness.

One or more exemplary embodiment provides a display device including the frame for a display device.

According to exemplary embodiments, a frame for display device includes a plurality of cover members. Each of the cover members includes a support portion including a supporting body extending in a first direction, and a first extending portion extending from the supporting body in a second direction substantially perpendicular to the first direction, the first extending portion supporting an edge portion of a support plate of the display device, and a sidewall portion extending from the support portion to form a predetermined acute angle with respect to the support portion and covering a side of the display device.

In exemplary embodiments, the support portion may further include a second extending portion extending from the supporting body in parallel with the first extending portion, the second extending portion being spaced apart from the first extending portion to define a guide recess, into which the edge portion of the support plate is inserted.

In exemplary embodiments, the first extending portion may have a width substantially the same as a width of the second extending portion, in the second direction.

In exemplary embodiments, the first extending portion may have a first width and the second extending portion may have a second width smaller than the first width, in the second direction.

In exemplary embodiments, the sidewall portion may extend from an end portion of the second extending portion.

In exemplary embodiments, the sidewall portion may further include a connecting portion extending from the support portion and in a third direction substantially perpendicular to the first and second directions.

In exemplary embodiments, the frame for display device may further include a reflection sheet on an inner sidewall of the sidewall portion.

In exemplary embodiments, the support portion and the sidewall portion may form a single, unitary indivisible cover member.

In exemplary embodiments, the cover member may include aluminum.

In exemplary embodiments, the frame for display device may further include a reinforcing member fixed to the support portion to support an outer sidewall of the sidewall portion.

In exemplary embodiments, the frame for display device may further include a connection member to connect end portions of adjacent cover members to each other.

According to exemplary embodiments, a display device includes a display panel, a backlight assembly rear of the display panel, a support plate supporting the backlight assembly, and a plurality of cover members fixing the support plate and covering sides of the backlight assembly. Each of the cover members includes a support portion including a supporting body extending in a first direction, and a first extending portion extending from the supporting body in a second direction substantially perpendicular to the first direction, the first extending portion supporting an edge portion of the support plate, and a sidewall portion extending from the support portion to form a predetermined acute angle with respect to the support portion and covering a side among the sides of the backlight assembly.

In exemplary embodiments, the support portion may further include a second extending portion extending from the supporting body in parallel with the first extending portion, the second extending portion being spaced apart from the first extending portion to define a guide recess, into which the edge portion of the support plate is inserted.

In exemplary embodiments, the first extending portion may have a width substantially the same as a width of the second extending portion, in the second direction.

In exemplary embodiments, the sidewall portion may extend from an end portion of the second extending portion.

In exemplary embodiments, the display device may further include a fixing member which extends through the edge portion of the support plate and the guide recess and into the support portion, to fix the support plate to the support portion.

In exemplary embodiments, the sidewall portion may further include a connecting portion extending from the support portion in a third direction substantially perpendicular to the first and second directions.

In exemplary embodiments, the display device may further include a reflection sheet on an inner sidewall of the sidewall portion.

In exemplary embodiments, the display device may further include a panel guide supporting the display panel, the panel guide being supported on an end portion of the sidewall portion.

In exemplary embodiments, the cover member may include aluminum, and the support portion and the sidewall portion form a single, unitary, indivisible cover member.

According to one or more exemplary embodiment, an edge of a support plate may be inserted into a guide recess of a cover member and fixed to the cover member. Accordingly, first and second extending portions of the cover member may extend along a length direction of the support plate to cover and support an entirety of the edge portion of the support plate. Thus, deflection of the support plate may be reduced or effectively prevented as compared with a conventional frame for a display device where the support plate is supported only by conventional fixing bolts spaced apart from one another.

Further, a sidewall portion of the cover member may extend from a support portion to form a predetermined acute angle with respect to the second direction of the support portion. Accordingly, the sidewall portion of the lightweight extruded cover member may have elasticity, rigidity and hardness enough to support a display panel of the display device.

BRIEF DESCRIPTION OF THE DRAWINGS

Exemplary embodiments will be more clearly understood from the following detailed description taken in conjunction with the accompanying drawings.

FIGS. 1 to 14 represent non-limiting, exemplary embodiments as described herein.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be explained in detail with reference to the accompanying drawings.

Figure 1:
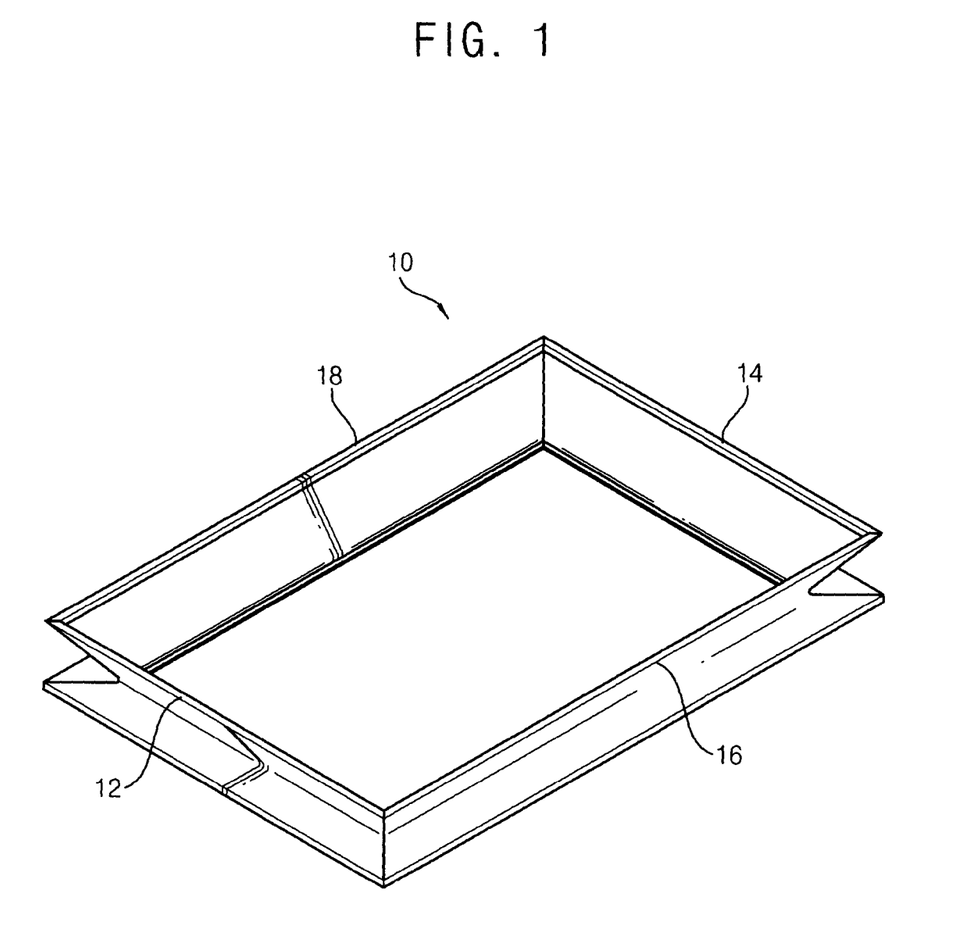
FIG. 1 is a perspective view illustrating an exemplary embodiment of a frame for a display device in accordance with the invention.
Figure 2:
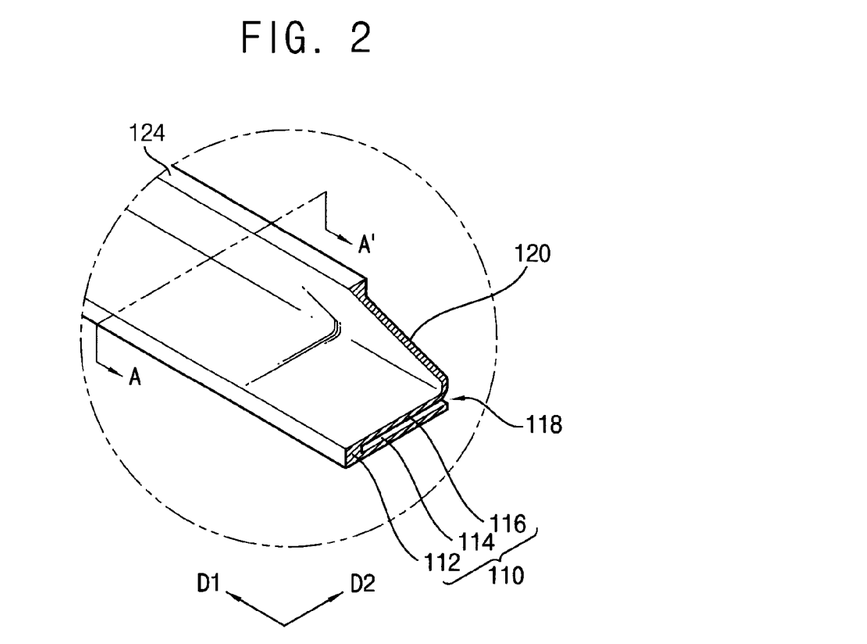
FIG. 2 is a perspective view illustrating an exemplary embodiment of a first cover member of the frame in FIG. 1.
Figure 3:
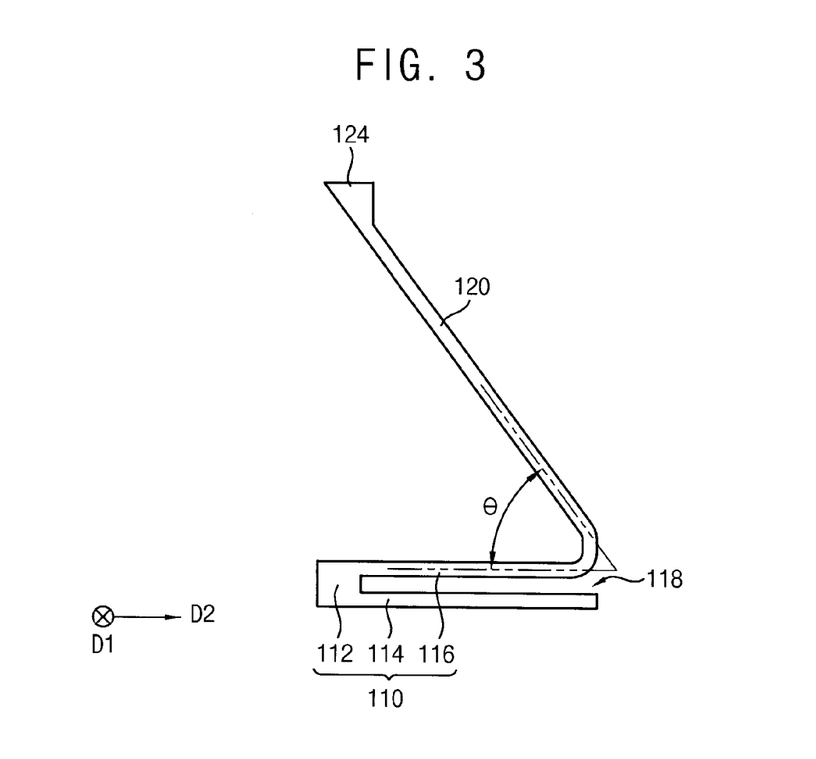
FIG. 3 is a cross-sectional view taken along line A-A' line in FIG. 2.

FIG. 1 is a perspective view illustrating an exemplary embodiment of a frame for a display device in accordance with the invention. FIG. 2 is a perspective view illustrating an exemplary embodiment of a first cover member of the frame in FIG. 1. FIG. 3 is a cross-sectional view taken along line A-A' line in FIG. 2.

Referring to FIGS. 1 to 3, a frame for a display device 10 may include four cover members which cover sides of the display device having a substantially rectangular shape, that is, a first cover member 12 and a second cover member 14 opposite to each other and a third cover member 16 and a fourth cover member 18 opposite to each other. The four first to fourth cover members 12, 14, 16 and 18 may be combined with each other to serve as a division type cover for covering four sides of the display device. That is, the four first to fourth cover members 12, 14, 16 and 18 may be separately provided (e.g., divided) and then combined with each other to collectively form the frame for a display device 10.

In one exemplary embodiment, for example, the first to fourth cover members 12, 14, 16 and 18 may receive a backlight assembly of the display device and cover four sides of the backlight assembly. The four cover members 12, 14, 16 and 18 may support a display panel of the display device and cover four sides of the display panel.

In an exemplary embodiment, the first to fourth cover members 12, 14, 16 and 18 may be formed (e.g., provided) by an extrusion process. In one exemplary embodiment, for example, the first to fourth cover members 12, 14, 16 and 18 may be formed using a conductive material such as metal including aluminum, or a non-conductive material such as plastic. The first to fourth cover members 12, 14, 16 and 18 may collectively form a single, unitary, indivisible frame for a display device 10, but the invention is not limited thereto. Alternatively, the first to fourth cover members 12, 14, 16 and 18 may be individually formed as a single, unitary, indivisible member and subsequently assembled to collectively form the frame for a display device 10.

Accordingly, each of the cover members may have a uniform thickness along a longitudinal direction, and smooth surface properties. Each cover member may have a lighter weight and provide excellent heat dissipation properties as compared with a conventional bottom chassis.

The first to fourth cover members 12, 14, 16 and 18 may have substantially the same shape and/or dimensions, except for a length thereof. Accordingly, hereinafter, the first cover member 12 will be explained in detail.

In exemplary embodiments, the first cover member 12 may include a support portion 110 and a sidewall portion 120. The support portion 110 may be elongated to extend in a first direction (D1) to cover a side of a support plate 20 (see FIG. 4) of the display device. In one exemplary embodiment, for example, the support plate 20 may be used to support and fix the backlight assembly of the display device. The support plate 20 may be a separate member from the first to fourth cover members 12, 14, 16 and 18.

The support portion 110 may include a supporting body 112 elongated to extend in the first (e.g., length) direction (D1), and a first extending portion 114 extending in a second (e.g., width) direction (D2) from the supporting body 112. The supporting body 112 may extend in the first direction (D1) to cover an edge portion of the side of the support plate 20 of the display device. The first extending portion 114 may extend from the supporting body 112 in the width direction (D2) to support the edge portion of the side of the support plate 20 of the display device. The first extending portion 114 may make contact with a lower surface of the side of the support plate 20 such that the first extending portion 114 may support the support plate 20.

As illustrated in FIGS. 2 and 3, the support portion 110 may further include a second extending portion 116 extending parallel with the first extending portion 114 and from the supporting body 112. The second extending portion 116 may be spaced apart from the first extending portion 114 in a third direction to define a guide recess 118, into which at least the edge portion of the side of the support plate 20 of the display device is received, to support the support plate 20.

The support portion 110 may form an inward recess to form the guide recess 118 which receives the edge portion of the support plate 20. Accordingly, the support portion 110 may have a U-shape in a cross-sectional view.

The sidewall portion 120 may extend upwardly in the third direction from the support portion 110. The sidewall portion 120 may be inclined (e.g., bent) from the support portion 110 to form an acute angle (θ) with respect to the support portion 110 in the width direction (D2) of the support portion 110. The sidewall portions 120 of the first to fourth cover members 12, 14, 16 and 18 may define a portion of an outer surface of a display device, but the invention is not limited thereto.

The sidewall portion 120 may extend upwardly from a distal end portion of the second extending portion 116. Alternatively, the sidewall portion 120 may extend upwardly from a location between the supporting body 112 and the distal end of the second extending portion 116 such as at a middle portion of the second extending portion 116, or from the supporting body 112.

In one exemplary embodiment, for example, the acute angle (θ) formed by the sidewall portion 120 and the support portion 110 may range from about 30 degrees to about 80 degrees. A length of the sidewall portion 120 taken from the support portion 110 to a distal end of the sidewall portion 120, the inclination angle (θ) formed by the sidewall portion 120 and the support portion 110, the position at which the sidewall portion 120 extends from the support portion 110, and so on may be determined based on the size and a thickness of the backlight assembly and/or the display panel.

The edge portion of the support plate 20 may be received or inserted into the guide recess 118, and then, fixed to the support portion 110 of the first cover member 12 such as by a fixing member 200 (see FIG. 7) including, but not limited to, a bolt. Accordingly, the first and second extending portions 114 and 116 of the support portion 110 may be elongated to extend along the edge portion of the support plate 20 and cover and support an entirety of the edge portion of the support plate 20. Therefore, in one or more exemplary embodiment, deflection of the support plate 20 may be reduced or effectively prevented as compared with a conventional display device where the support plate of the display device is supported by conventional fixing bolts spaced apart from one another.

Hereinafter, a display device including the frame in FIG. 1 will be explained.

Figure 4:
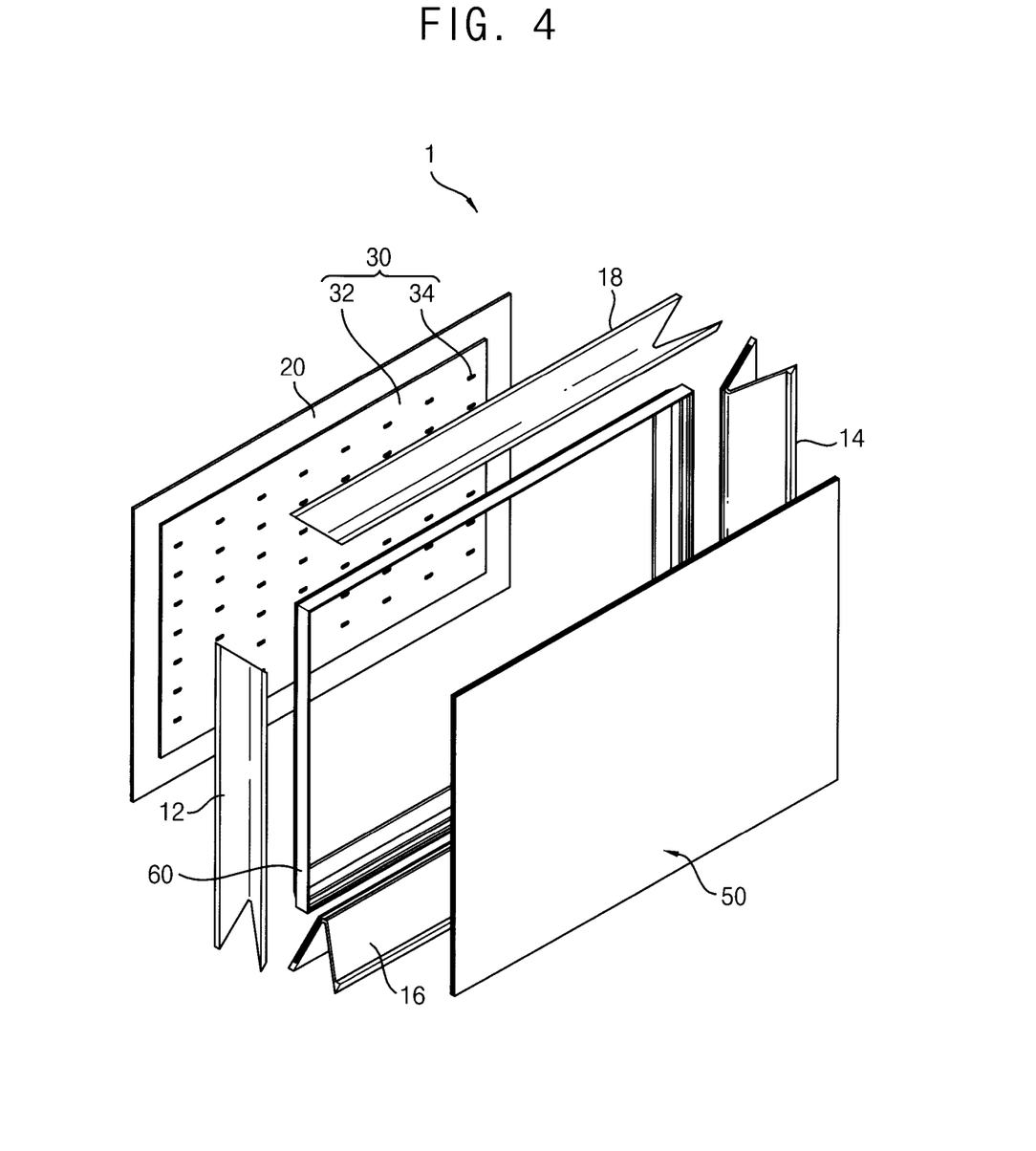
FIG. 4 is an exploded perspective view illustrating an exemplary embodiment of a display device in accordance with the invention.
Figure 5:
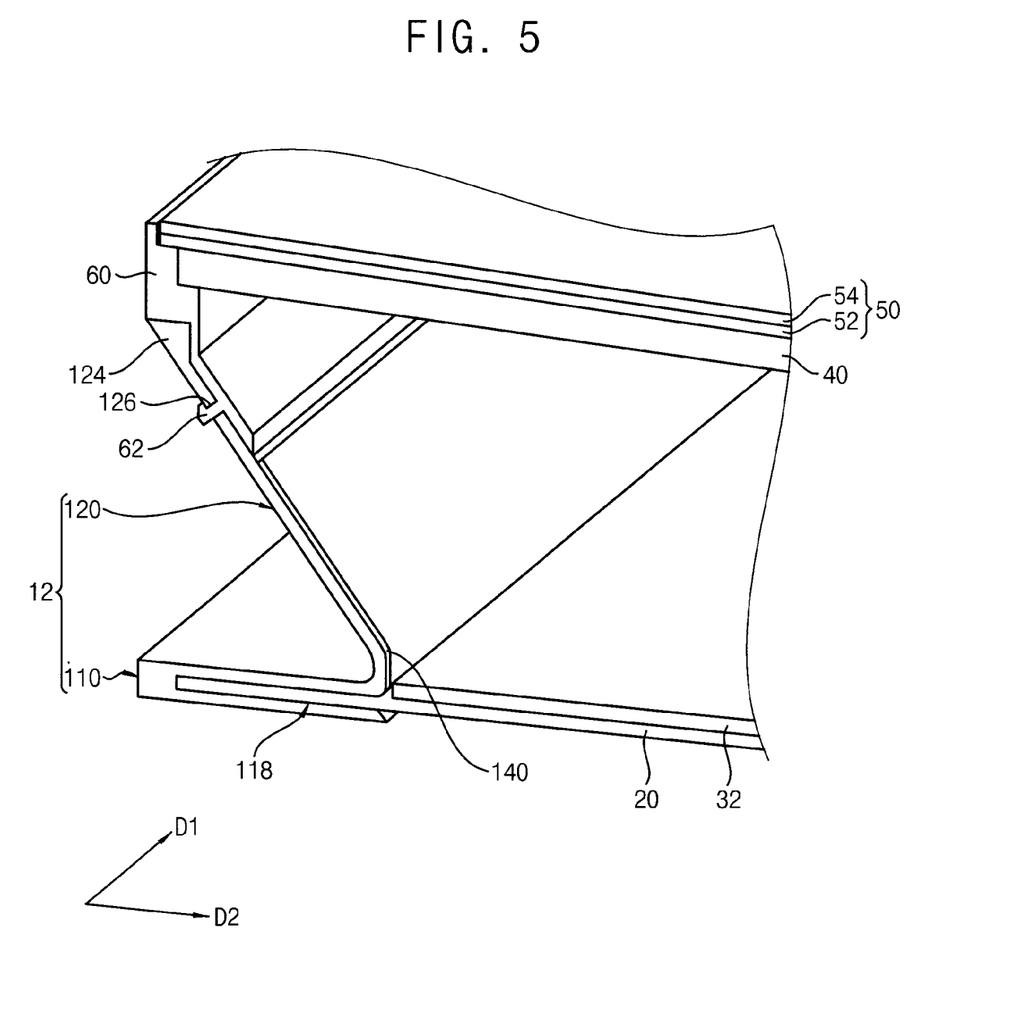
FIG. 5 is a perspective view illustrating a portion of the display device in FIG. 4.
Figure 6:
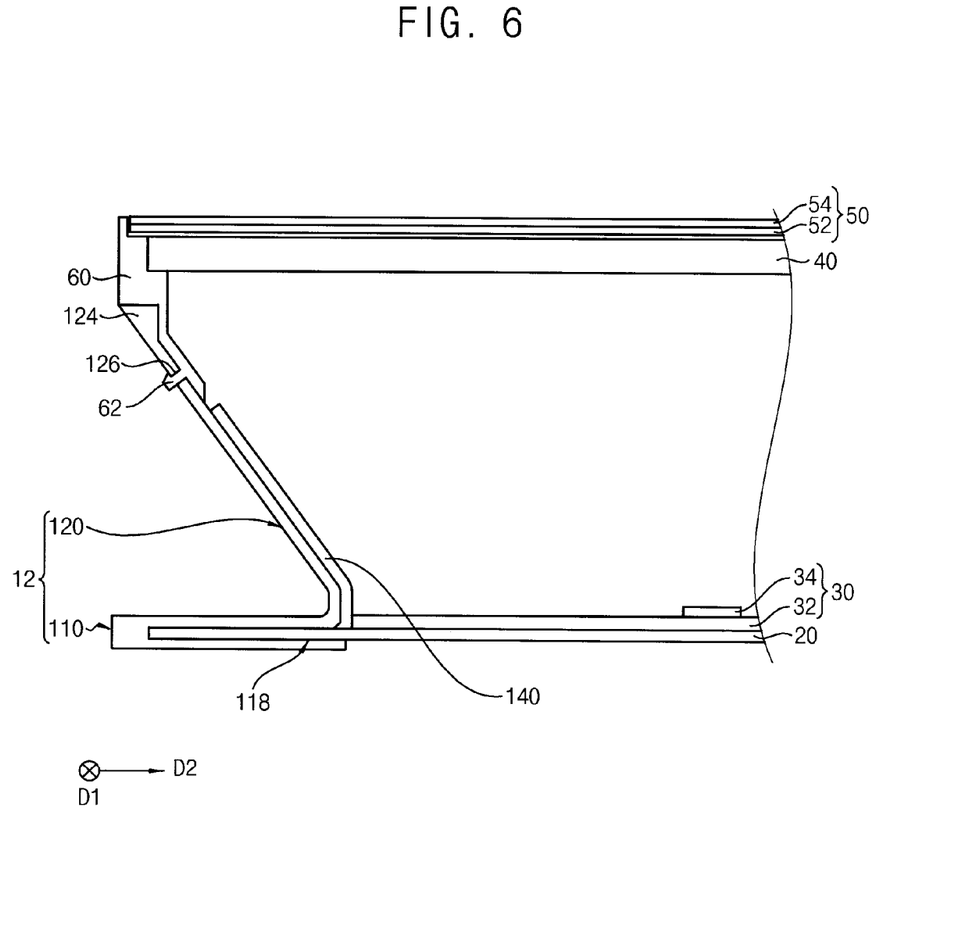
FIG. 6 is a cross-sectional view illustrating the portion of the display device in FIG. 5.

FIG. 4 is an exploded perspective view illustrating an exemplary embodiment of a display device in accordance with the invention. FIG. 5 is a perspective view illustrating a portion of the display device in FIG. 4. FIG. 6 is a cross-sectional view illustrating the portion of the display device in FIG. 5.

Referring to FIGS. 4 to 6, a display device 1 may include a display panel 50, a backlight assembly 30 disposed rear of the display panel 50 (e.g., opposite to a display side of the display device 1), a support plate 20 supporting the backlight assembly 30, and a plurality of cover members 12, 14, 16 and 18 fixing the support plate 20 and supporting a side of the backlight assembly 30.

In exemplary embodiments, the display panel 50 may include a first substrate 52, a second substrate 54 facing the first substrate 52, and a liquid crystal layer (not illustrated) between the first substrate 52 and the second substrate 54. The first and second substrates 52 and 54 may include a plurality of electrodes for controlling the liquid crystal layer. Arrangements of liquid crystal molecules in the liquid crystal layer may be adjusted according to an electric field between the electrodes to control light transmittance of the display panel 50.

The backlight assembly 30 may be disposed rear of the display panel 50 to supply light to the display panel 50 which displays an image. The backlight assembly 30 may include a light source 34 and a circuit board 32. The support plate 20 may have a substantially rectangular shape. The support plate 20 may support the backlight assembly 30. Accordingly, the support plate 20 may serve as a lower plate for supporting and receiving the backlight assembly 30.

A plurality of the cover members 12, 14, 16 and 18 may fix the support plate 20 and cover sides of the backlight assembly 30 to receive the backlight assembly 30 therein. Additionally, a lower plate (not illustrated) is further provided on a lower surface of the support plate 20 to cover the support plate 20 and the cover members 12, 14, 16 and 18.

The first to fourth cover members 12, 14, 16 and 18 may be combined with each other to form a collective frame having a rectangular shape. Four edge portions of the support plate 20 may be inserted into and fixed to support portions 110 of the first to fourth cover members 12, 14, 16 and 18, respectively.

Figure 7:
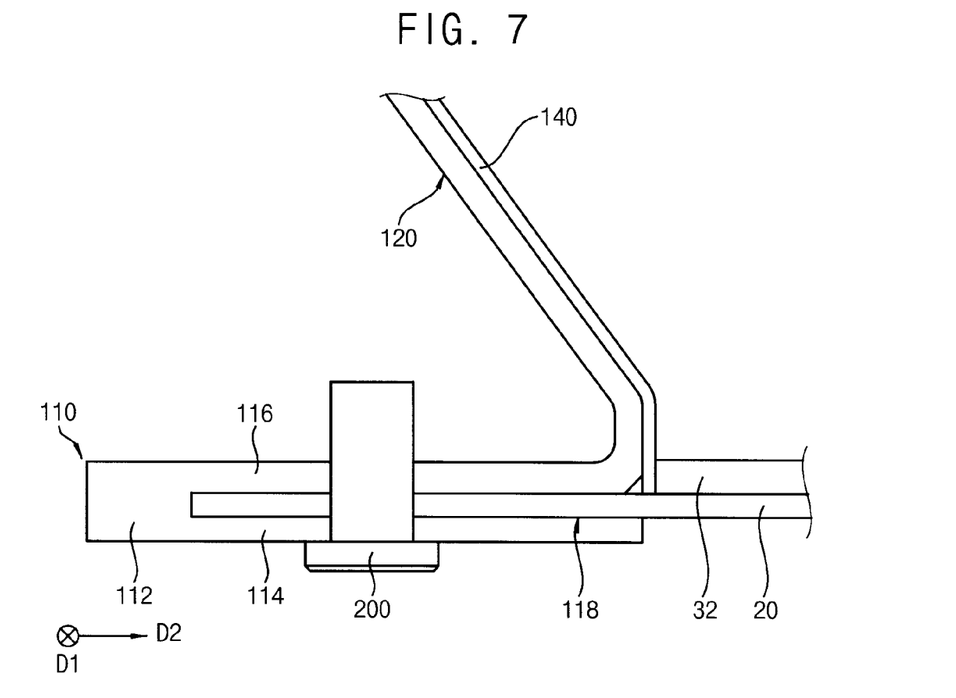
FIG. 7 is a cross-sectional view illustrating an exemplary embodiment of a support plate fixed by a fixing member to a first cover member of a frame in accordance with the invention.

As illustrated in FIGS. 5 and 6, the edge portion of the support plate 20 may be inserted into a guide recess 118, and fixed in the guide recess 118 and to the support portion 110 of the first cover member 12 by a fixing member 200 including, but not limited to, a bolt (see FIG. 7).

In exemplary embodiments, the backlight assembly 30 may include point light sources 34 such as a light emitting diode ("LED"), and may be a direct type backlight assembly, but the invention is not limited thereto. In one exemplary embodiment, for example, the circuit substrate 32 may be disposed on the support plate 20, and a plurality of the LED light sources 34 may be arranged in a matrix array on the circuit board 32.

In exemplary embodiments, the display device 1 may further include a panel guide 60 for supporting the display panel 50. A sidewall portion 120 may include a fixing portion at an end thereof and having a support protrusion 124 at a distal end thereof. The panel guide 60 may be combined with and supported by the fixing portion of the sidewall portion 120.

The panel guide 60 may be supported by the support protrusion 124 of the sidewall portion 120. A fixing hole 126 may be defined in the sidewall portion 120, and a fixing hook 62 of the panel guide 60 may be inserted into and fixed to the fixing hole 126.

As illustrated in FIGS. 5 and 6, the support portion 110 of the first cover member 12 may be elongated to extend in a first direction (D1) to cover and support the edge portions of the support plate 20. The sidewall portion 120 of the first cover member may extend from the support portion 110 such that the sidewall portion 120 is inclined to form a predetermined acute angle (Θ) with respect to the support portion 110 in a width direction (D2) of the support portion 110.

The panel guide 60 may be supported on the end portion of the sidewall portion 120. The sidewall portion 120 may form an angle with respect to a load of the panel guide 60 which is applied in a loading direction to the sidewall portion 110. Accordingly, the sidewall portion 120 of the lightweight extruded first cover member 12 may have excellent elasticity, rigidity and hardness with respect to the panel guide 60.

The backlight assembly 30 may further include an optical unit 40 on and facing the LED light sources 34. The optical unit 40 may include a diffusion plate, a diffusion sheet and/or a condensing sheet, but is not limited thereto.

Additionally, a reflection sheet 140 may be further provided on an inner sidewall of the sidewall portion 120 of the first cover member 12. Light from the LED light sources 34 may be reflected by the reflection sheet 140 and then incident on the optical unit 40.

Hereinafter, an exemplary embodiment of a method of manufacturing a display device using the frame in FIG. 1 will be explained.

FIG. 7 is a cross-sectional view illustrating an exemplary embodiment of a support plate fixed to a cover member by a fixing member, with reference to FIG. 4.

Referring to FIG. 7, in exemplary embodiments, the edge portion of the support plate 20 may be inserted into the guide recess 118 of the support portion 110, and the inserted edge portion of the support plate 20 may be fixed to the support portion 110 of the first cover member 12 by a fixing bolt 200.

Accordingly, the support plate 20 may be inserted into the guide recess 118 of the extruded first cover member 12 and then assembled using the fixing bolt 200, to thereby reduce or effectively prevent deflection of the support plate 20.

Figure 8:
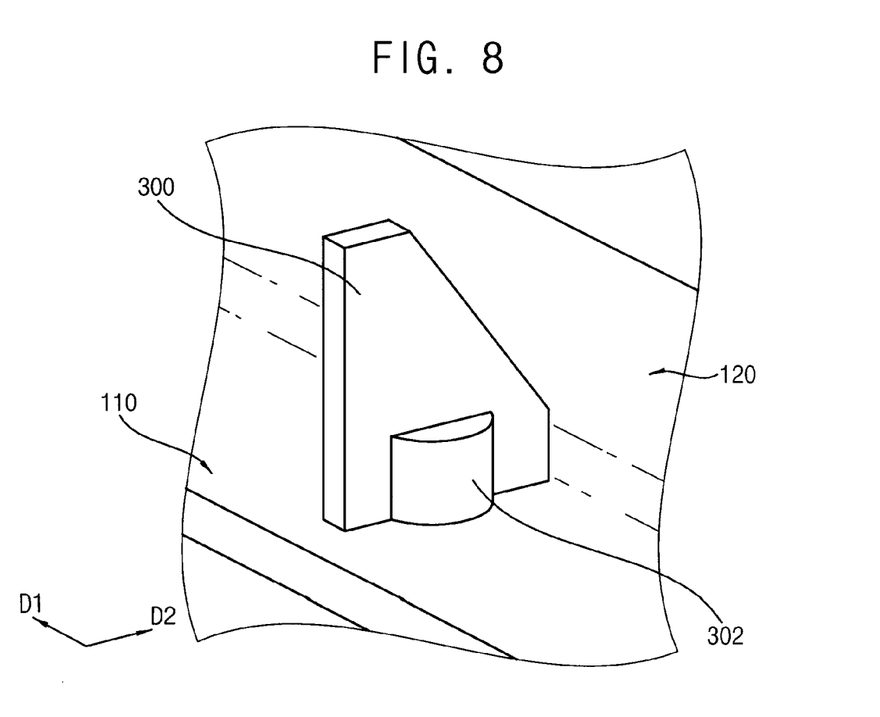
FIG. 8 is a perspective view illustrating an exemplary embodiment of a first cover member supported by a reinforcing member in accordance with the invention.
Figure 9:
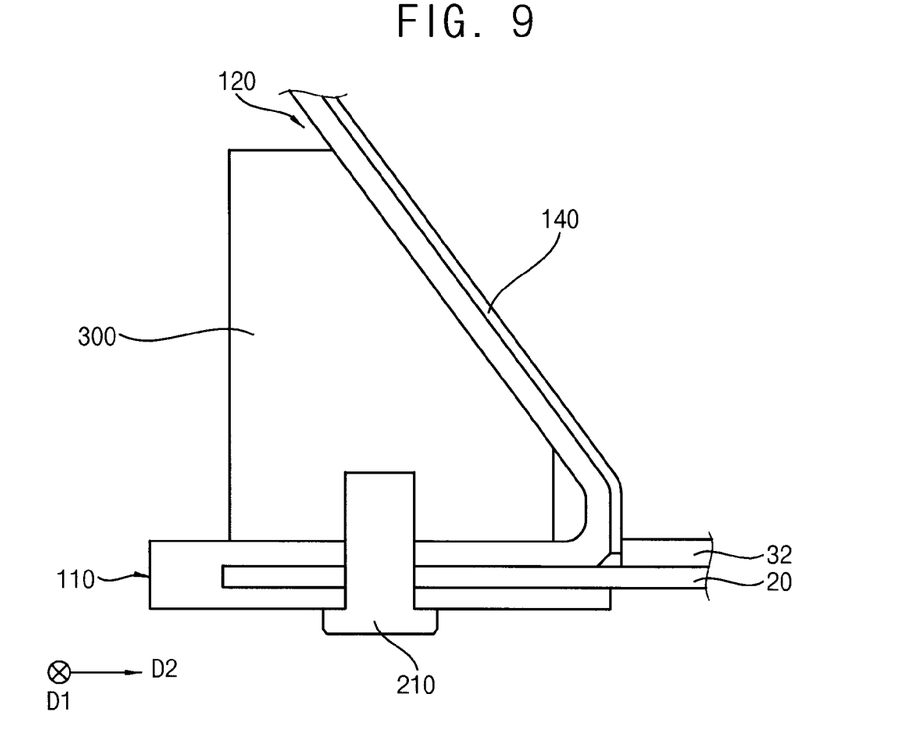
FIG. 9 is a cross-sectional view illustrating the first cover member supported by the reinforcing member in FIG. 8.

FIG. 8 is a perspective view illustrating an exemplary embodiment of a first cover member supported by a reinforcing member in accordance with the invention. FIG. 9 is a cross-sectional view illustrating the first cover member supported by the reinforcing member in FIG. 8.

Referring to FIGS. 8 and 9, in exemplary embodiments, a reinforcing member 300 may be fixed to the support portion 110 to support an outer sidewall of the sidewall portion 120. The cover member may include the reinforcing member 300, or the reinforcing member 300 may be an element separate from the cover member.

After the edge portion of the support plate 20 is inserted into the guide recess 118 of the support portion 110, the reinforcing member 300 may be disposed on the support portion 110. In one exemplary embodiment, for example, a plurality of the reinforcing members 300 may be arranged spaced apart from one another in an extending direction (D1) of the support portion 110.

A fixing member 210 including, but not limited to, a bolt, may penetrate the support portion 110, the inserted portion of the support plate 20 and a combining portion 302 of the reinforcing member 300, to secure the support plate 20 and the reinforcing member 300 to the support portion 110.

The reinforcing member 300 may have an inclined surface corresponding to the sidewall portion 120. The inclined surface of the reinforcing member 300 may contact the outer sidewall of the sidewall portion 120 to support the sidewall portion 120. Accordingly, the rigidity and hardness of the cover member may be improved.

Figure 10:
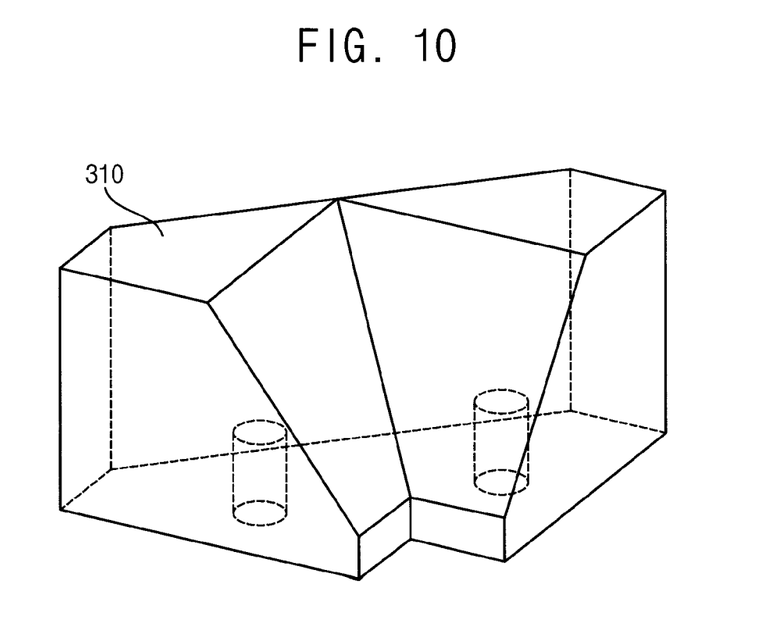
FIG. 10 is a perspective view illustrating an exemplary embodiment of a corner reinforcing member in accordance with the invention.
Figure 11:
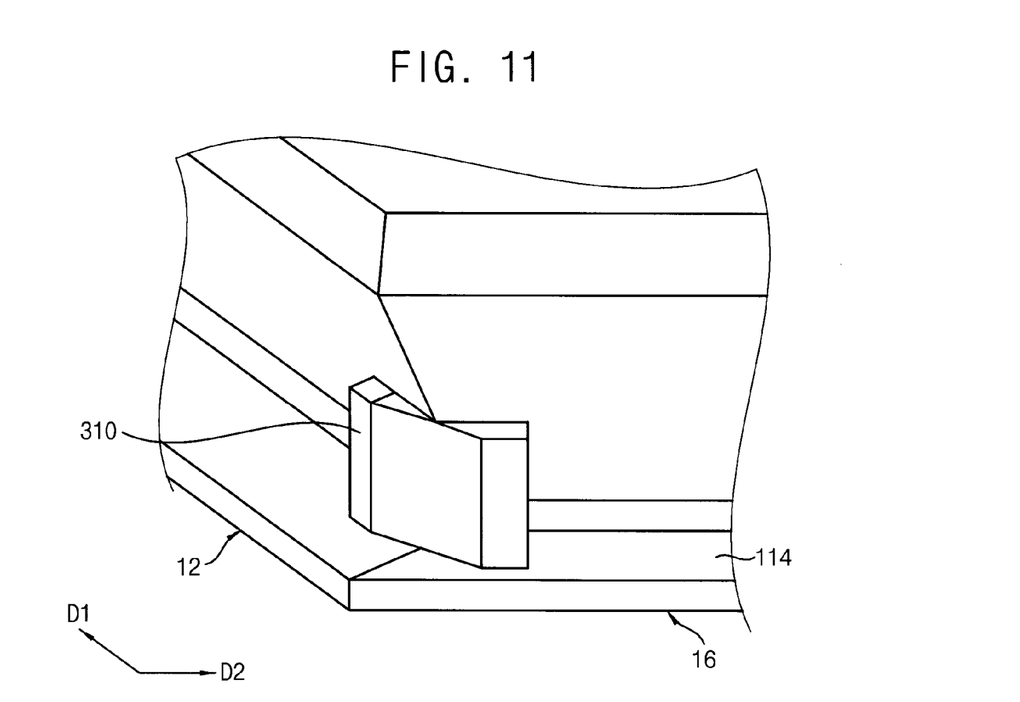
FIG. 11 is a perspective view illustrating an exemplary embodiment of first and third cover members supported by the corner reinforcing member in FIG. 10.

FIG. 10 is a perspective view illustrating an exemplary embodiment of a corner reinforcing member in accordance with the invention. FIG. 11 is a perspective view illustrating an exemplary embodiment of first and third cover members supported by the corner reinforcing member in FIG. 10.

Referring to FIGS. 10 and 11, in exemplary embodiments, a corner reinforcing member 310 may be fixed to the support portions 120 of the first and third cover members 12 and 16 adjacent to each other, such as at a corner of the frame where the first and third cover members 12 and 16 meet each other, to support the outer sidewalls of the sidewall portions 120 of the first and third cover members 12 and 16.

A corner portion of the support plate 20 may be supported by the end portions of the first and third cover members 12 and 16 where the first and third cover members 12 and 16 are joined to each other. The corner reinforcing member 310 may be disposed on the end portions of the first and third cover members 12 and 16. In one exemplary embodiment, for example, four corner reinforcing members 310 may be arranged respectively on the corners of the frame where the first to fourth cover members 12, 14, 16 and 18 meet each other.

One or more fixing member such as a bolt may penetrate the support portion 110 of the cover member, the support plate 20 and the corner reinforcing member 310, to secure the support plate 20 and the corner reinforcing member 310 to the support portion 110 of the cover member.

The corner reinforcing member 310 may have inclined surfaces corresponding to each sidewall portion 120 of the adjacent cover members. The inclined surfaces of the corner reinforcing member 310 may contact the outer sidewalls of the sidewall portions 120 of the adjacent cover members, respectively, to support the sidewall portions 120. Accordingly, deflection and bending of the display device may be reduced or effectively prevented.

Figure 12:
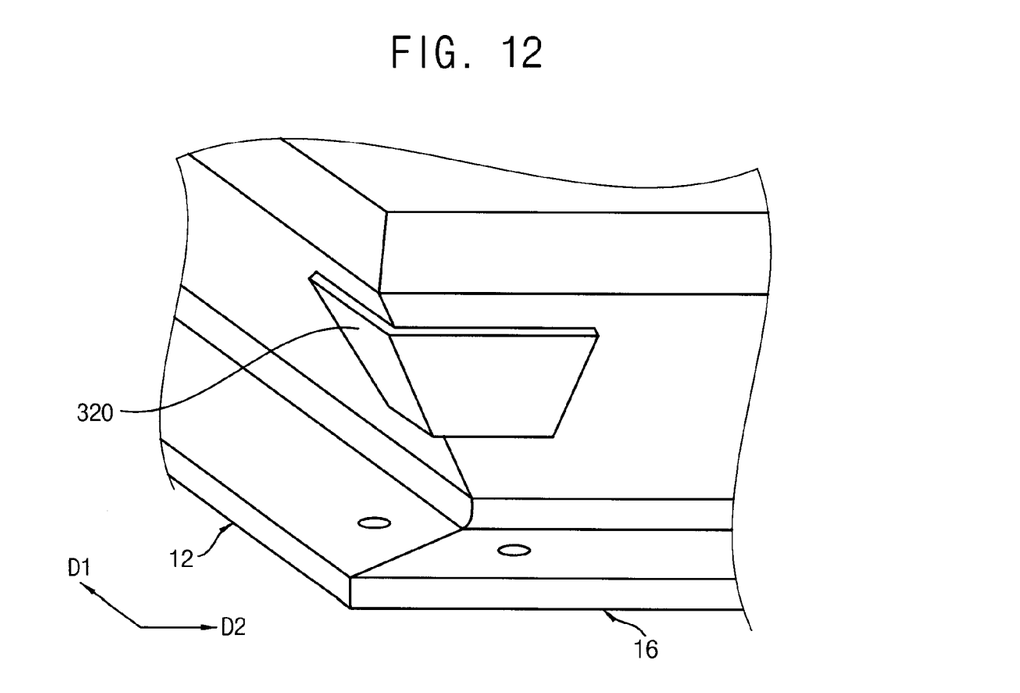
FIG. 12 is a perspective view illustrating an exemplary embodiment of first and third cover member connected by a connection member in accordance with the invention.

FIG. 12 is a perspective view illustrating an exemplary embodiment of first and third cover members connected by a connection member in accordance with the invention.

Referring to FIG. 12, in exemplary embodiments, a connection member 320 may be fixed to the sidewall portions 120 of the first and third cover members 12 and 16 adjacent to each other, at a corner of the frame where the first and third cover members 12 and 16 meet each other, to connect the first and third cover members 12 and 16 to each other.

The connection member 320 may be disposed on the sidewall portions 120 of the adjacent first and third cover members 12 and 16. In one exemplary embodiment, for example, four connection members 320 may be arranged respectively on the corners of the frame where the first to fourth cover members 12, 14, 16 and 18 meet each other.

Accordingly, the connection member 320 may cover the outer sidewalls of the sidewall portions 120 of the first and third cover members 12 and 16 to connect the first and third cover members 12 and 16 to each other. Thus, the rigidity of the frame including the cover members may be improved and deflection and bending of the display device may be reduced or effectively prevented.

Figure 13:
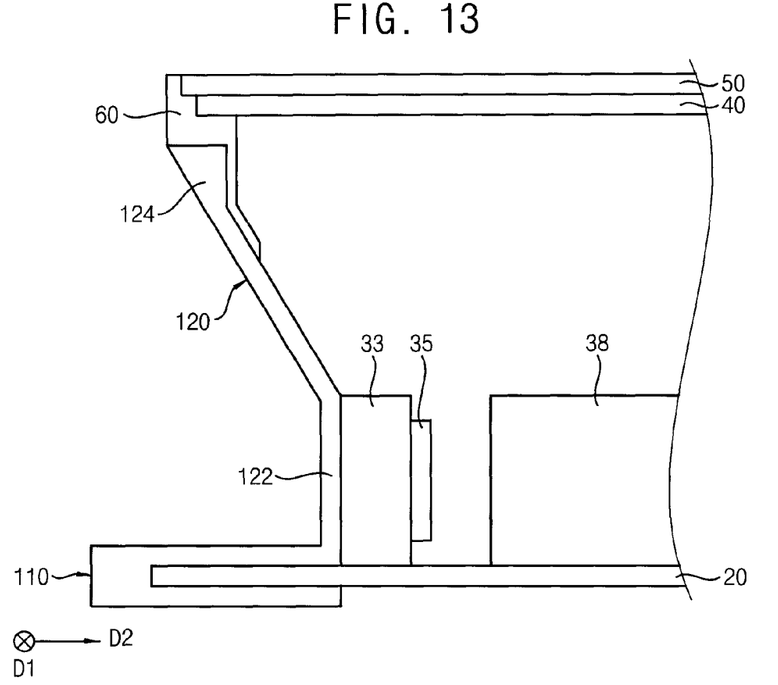
FIG. 13 is a cross-sectional view illustrating another exemplary embodiment of a display device in accordance with the invention.

FIG. 13 is a cross-sectional view illustrating another exemplary embodiment of a display device in accordance with the invention. The display device in FIG. 13 may be substantially the same as or similar to the display device in FIG. 4, except for a structure of a cover member according to a backlight assembly structure. Thus, same reference numerals will be used to refer to the same or like elements as those described in the display device in FIG. 4, and any further repetitive explanation concerning the above elements will be omitted.

Referring to FIG. 13, in exemplary embodiments, a display device may include a display panel 50, a backlight assembly 30 rear of the display panel 50, a support plate 20 supporting the backlight assembly 30, and a plurality of cover members 12, 14, 16 and 18 fixing the support plate 20 and covering sides of the backlight assembly 30.

In the illustrated exemplary embodiment, a sidewall portion 120 of the first cover member may further include a connecting portion 122. The connecting portion 122 may extend from the support portion 110 in a direction substantially perpendicular to a width direction (D2). Accordingly, a middle portion of the sidewall portion 120 may be an inclined portion, and the inclined portion may extend to form a predetermined acute angle with respect to the support portion 110 in the width direction (D2). The angle formed by the middle portion of the sidewall portion 120, may be different from the angles formed by a lower portion (e.g., connecting portion 122) and an upper portion (e.g., support protrusion 124).

The backlight assembly 30 may include point light sources 35 such as an LED and be an edge type backlight assembly 30. In one exemplary embodiment, for example, a circuit substrate 33 may be disposed on an inner sidewall of the connecting portion 122 of the sidewall portion 120, and a plurality of the LED light sources 35 may be arranged spaced apart from one another in a longitudinal direction (D1) of the sidewall portion 120. A light guide plate 38 may be disposed on a support plate 20, and a side of the light guide plate 38 may face the LED light sources 35. The side of the light guide plate 38 may be referred to as a light incident surface, and may connect a light exiting surface facing the display panel 50 and an opposite surface opposing the light exiting surface. The light incident surface may be one of a plurality of surfaces connecting the light exiting surface to the opposite surface.

Figure 14:
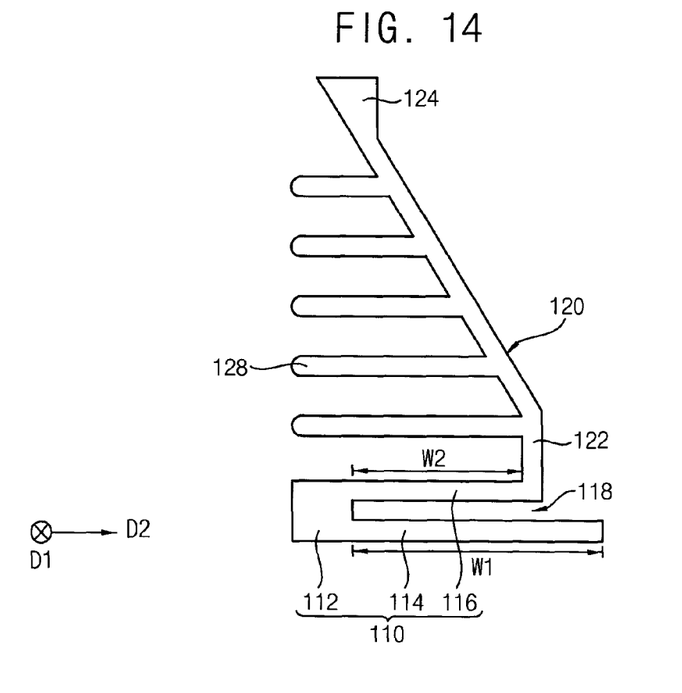
FIG. 14 is a cross-sectional view illustrating another exemplary embodiment of a cover member of a frame for a display device in accordance with the invention.

FIG. 14 is a cross-sectional view illustrating another exemplary embodiment of a cover member of a frame for a display device in accordance with the invention. The cover member and the frame may be substantially the same as or similar to the cover member and the frame in FIG. 1, except for a structure of a support portion and additional heat dissipation pins. Thus, same reference numerals will be used to refer to the same or like elements as those described in the display device in FIG. 1, and any further repetitive explanation concerning the above elements will be omitted.

Referring to FIG. 14, in exemplary embodiments, the first cover member 12 may include a support portion 110 and a sidewall portion 120. The support portion 110 may be elongated to extend in a direction (D1) to cover a side of a support plate 20 (see FIG. 4) of the display device.

The support portion 110 may include a supporting body 112 elongated to extend in the first direction (D1), a first extending portion 114 extending from the supporting body 112 in a second (e.g., width) direction (D2), and a second extending portion 116 extending form the supporting body 112 parallel with the first extending portion 114. The second extending portion 116 may be spaced apart from the first extending portion 114 to define a guide recess 118 into which an edge of the support plate 20 is inserted.

In the illustrated exemplary embodiment, the first extending portion 114 may have a first width (W1), and the second extending portion 116 may have a second width (W2) smaller than the first width (W1). The sidewall portion 120 may include heat dissipation pins 128 on an outer sidewall of the sidewall portion 120. The heat dissipation pin 128 may protrude from the outer surface of the sidewall portion 120. The heat dissipation pins 128 may be space apart from one another along a third direction of the first cover member 12, that is, a longitudinal direction of the sidewall portion 120. Accordingly, a heat dissipation performance of the display device may be improved.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the invention. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A frame for a display device, comprising:
a cover member provided in plural each as a single, unitary, indivisible member, the cover member defining:
a supporting body thereof which extends in a first direction along a length of the cover member,
a first extending portion thereof which extends from the supporting body in a second direction substantially perpendicular to the first direction and on which an edge portion of a support plate of the display device is supported; and
a second extending portion thereof which extends directly from the supporting body in the second direction to overlap the edge portion of the support plate which is on the first extending portion,
the second extending portion which overlaps the edge portion of the support plate defines an extension portion thereof which overlaps the edge portion of the support plate, the extension portion spaced apart from the first extending portion and defining a guide recess therebetween in which the edge portion of the support plate is disposed,
wherein from a distal end of the extension portion which overlaps the edge portion of the support plate, the second extending portion extends away from the support plate in the second direction to define a sidewall portion of the cover member, the sidewall portion forming a predetermined acute angle with respect to the extension portion and covers a side of the display device wherein the second extending portion further defines a connecting portion between the sidewall portion and the distal end of the extension portion which overlaps the edge portion of the support plate, the connecting portion extended in a third direction substantially perpendicular to the first and second directions.

2. The frame for a display device of claim 1, wherein in the second direction a width of the first extending portion is substantially the same as a width of the extension portion which overlaps the edge portion of the support plate.

3. The frame for a display device of claim 1, wherein in the second direction, a width of the first extending portion is greater than a width of the extension portion which overlaps the edge portion of the support plate.

4. The frame for a display device of claim 1, further comprising a reflection sheet on an inner sidewall of the sidewall portion.

5. The frame for a display device of claim 1, wherein the cover members comprise aluminum.

6. The frame for a display device of claim 1, wherein the supporting body, the first extending portion and the extension portion which overlaps the edge portion of the support plate together define a support portion of the cover member,
further comprising a reinforcing member which is fixed to the support portion and supports an outer sidewall of the sidewall portion.

7. The frame for a display device of claim 1, further comprising a connection member which connects end portions of adjacent cover members to each other.

8. A display device, comprising:
a display panel;
a backlight assembly rear of the display panel;
a support plate which supports the backlight assembly; and
a cover member provided in plural each as a single, unitary, indivisible member which fixes the support plate and covers sides of the backlight assembly,
the cover member defining:
a supporting body thereof which extends in a first direction along a length of the cover member,
a first extending portion thereof which extends from the supporting body in a second direction substantially perpendicular to the first direction and on which an edge portion of the support plate is supported; and
a second extending portion thereof which extends directly from the supporting body in the second direction to overlap the edge portion of the support plate which is on the first extending portion,
the second extending portion which overlaps the edge portion of the support plate defines an extension portion thereof which overlaps the edge portion of the support plate, the extension portion spaced apart from the first extending portion and defining a guide recess therebetween in which the edge portion of the support plate is disposed, wherein from a distal end of the extension portion which overlaps the edge portion of the support plate, the second extending portion extends away from the support plate in the second direction to define a sidewall portion of the cover member, the sidewall portion forming a predetermined acute angle with respect to the extension portion and covers a side among the sides of the backlight assembly wherein the second extending portion further defines a connecting portion between the sidewall portion and the distal end of the extension portion which overlaps the edge portion of the support plate, the connecting portion extended in a third direction substantially perpendicular to the first and second directions.

9. The display device of claim 8, wherein in the second direction, a width of the first extending portion is substantially the same as a width of the extension portion which overlaps the edge portion of the support plate.

10. The display device of claim 8, wherein the supporting body, the first extending portion and the extension portion which overlaps the edge portion of the support plate together define a support portion of the cover member, further comprising a fixing member which extends through the edge portion of the support plate and the guide recess and into the support portion, to fix the support plate to the support portion.

11. The display device of claim 8, further comprising a reflection sheet on an inner sidewall of the sidewall portion of the cover member.

12. The display device of claim 8, further comprising a panel guide which supports the display panel, wherein the panel guide is supported on an end portion of the sidewall portion.

13. The display device of claim 8, wherein
the cover members further comprise aluminum.

\* \* \* \* \*